United States Patent

Okamoto et al.

(10) Patent No.: US 10,178,258 B2
(45) Date of Patent: Jan. 8, 2019

(54) IMAGE DISPLAY APPARATUS, IMAGE FORMING APPARATUS, AND NON-TRANSITORY COMPUTER READABLE MEDIUM WITH DISTANCE-BASED IMAGE ADJUSTMENT

(71) Applicant: FUJI XEROX CO., LTD., Tokyo (JP)

(72) Inventors: Kensuke Okamoto, Kanagawa (JP); Yoshifumi Bando, Kanagawa (JP); Yuichi Kawata, Kanagawa (JP); Hideki Yamasaki, Kanagawa (JP); Ryoko Saitoh, Kanagawa (JP); Tomoyo Nishida, Kanagawa (JP); Mayumi Makiyama, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/445,329

(22) Filed: Feb. 28, 2017

(65) Prior Publication Data

US 2018/0091677 A1 Mar. 29, 2018

(30) Foreign Application Priority Data

Sep. 27, 2016 (JP) ................................. 2016-188477

(51) Int. Cl.
*G06F 15/00* (2006.01)
*G06F 3/12* (2006.01)
*G06K 1/00* (2006.01)
*H04N 1/00* (2006.01)

(52) U.S. Cl.
CPC ...... *H04N 1/00912* (2013.01); *H04N 1/00336* (2013.01); *H04N 1/00411* (2013.01); *H04N 1/00469* (2013.01); *H04N 1/00474* (2013.01); *H04N 2201/0081* (2013.01); *H04N 2201/0082* (2013.01)

(58) Field of Classification Search
CPC .......... H04N 1/00912; H04N 1/00336; H04N 1/00411; H04N 1/00469; H04N 1/00474; H04N 2201/0081; H04N 2201/0082
USPC ............................... 358/1.1, 1.15, 1.13, 1.14
See application file for complete search history.

(56) References Cited

U.S. PATENT DOCUMENTS

2016/0150111 A1* 5/2016 Sakamoto .......... H04N 1/00891
358/1.13
2017/0310956 A1* 10/2017 Perdices-Gonzalez .....................
H04N 13/0497

FOREIGN PATENT DOCUMENTS

JP 2009-031368 A 2/2009
JP 2009-294740 A 12/2009

* cited by examiner

*Primary Examiner* — Douglas Tran
(74) *Attorney, Agent, or Firm* — Oliff PLC

(57) ABSTRACT

An image display apparatus includes an image display that displays an image, and a change processing section that, if the image display is present in a user's gaze direction and if a distance between the user and the image display is shorter than a predetermined distance, performs a change process on the image displayed on the image display.

8 Claims, 7 Drawing Sheets

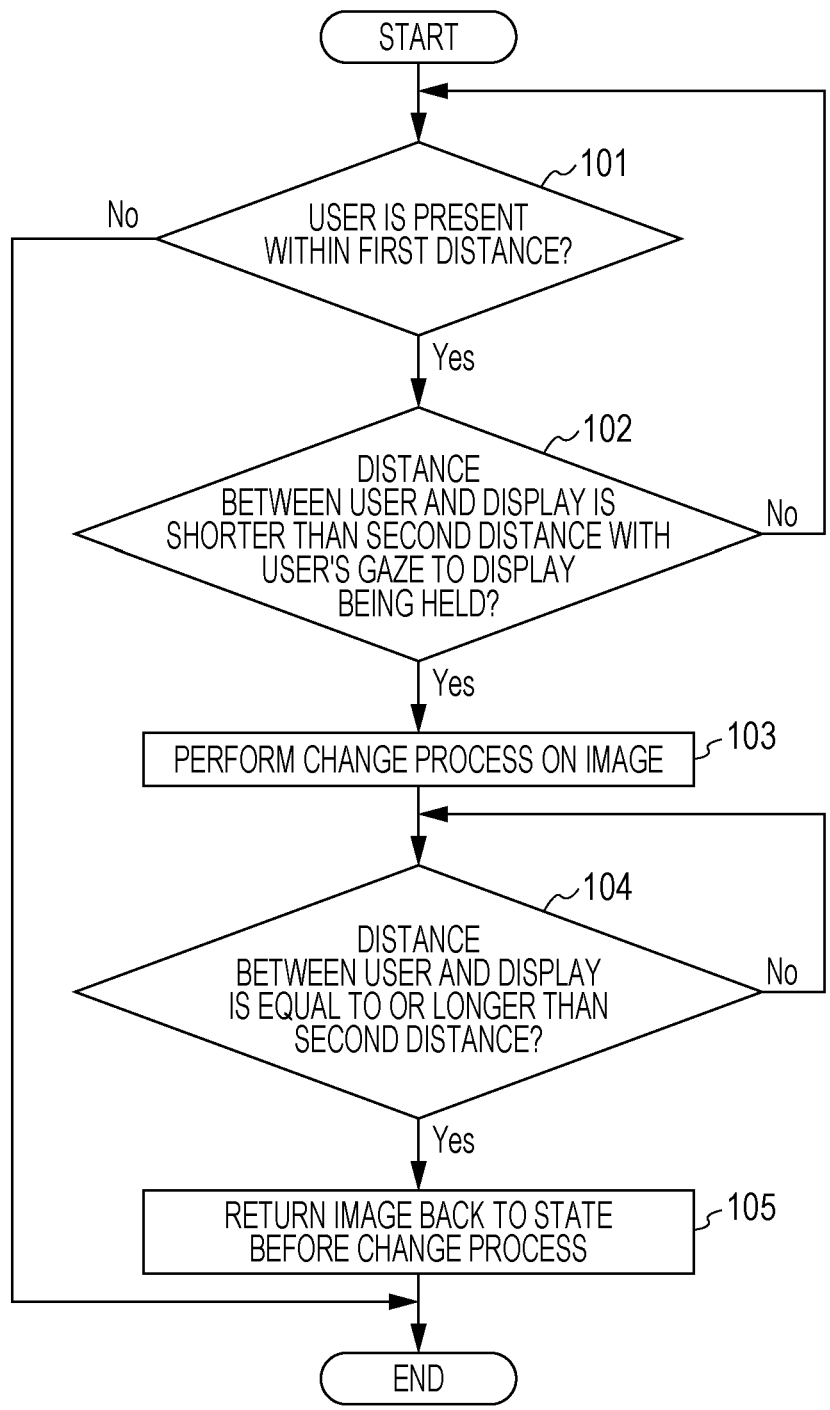

IMAGE DISPLAY APPARATUS, IMAGE FORMING APPARATUS, AND NON-TRANSITORY COMPUTER READABLE MEDIUM WITH DISTANCE-BASED IMAGE ADJUSTMENT

CROSS-REFERENCE TO RELATED APPLICATIONS

This application is based on and claims priority under 35 USC 119 from Japanese Patent Application No. 2016-188477 filed Sep. 27, 2016.

BACKGROUND

Technical Field

The present invention relates to an image display apparatus, an image forming apparatus, and a non-transitory computer readable medium.

SUMMARY

According to an aspect of the invention, there is provided an image display apparatus including an image display that displays an image, and a change processing section that, if the image display is present in a user's gaze direction and if a distance between the user and the image display is shorter than a predetermined distance, performs a change process on the image displayed on the image display.

BRIEF DESCRIPTION OF THE DRAWINGS

Exemplary embodiment of the present invention will be described in detail based on the following figures, wherein:

FIG. 6 is a flowchart illustrating an exemplary procedure performed by the image forming apparatus according to the exemplary embodiment.

DETAILED DESCRIPTION

Referring to the attached drawings, an exemplary embodiment of the present invention will be described in detail below.

Configuration of Image Forming Apparatus

Figure 1:
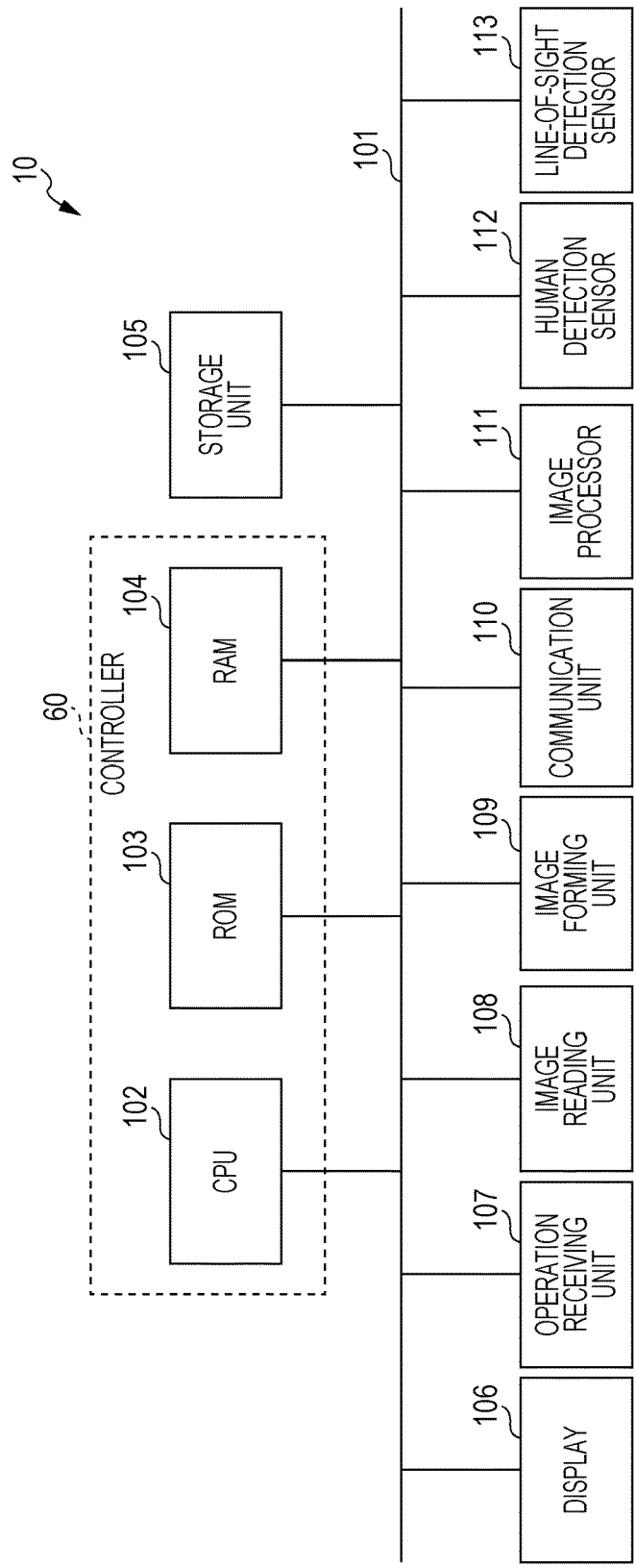
FIG. 1 is a diagram illustrating an exemplary configuration of an image forming apparatus according to an exemplary embodiment.

The Configuration of an image forming apparatus 10 according to the exemplary embodiment will be described. FIG. 1 is a diagram illustrating an exemplary configuration of the image forming apparatus 10 according to the exemplary embodiment.

As illustrated in FIG. 1, the functional units that are included in the image forming apparatus 10 according to the exemplary embodiment are connected to a bus 101 and transmit/receive data via the bus 101.

A display 106, which serves as an exemplary image display, displays various images about the image forming apparatus 10. For example, the display 106 displays multiple options that are to be selected by a user when the user operates the image forming apparatus 10.

An operation receiving unit 107 receives operations from a user. More specifically, the operation receiving unit 107 receives user operations performed on information displayed on the display 106. For example, when multiple options are displayed on the display 106, the operation receiving unit 107 receives user selection of an option.

The display 106 and the operation receiving unit 107 are formed by using a touch panel display, and the operation receiving unit 107 and the display 106 are disposed so that the operation receiving unit 107 is superposed on the display 106. However, the operation receiving unit 107 is not limited to one formed by using a touch panel display. For example, the operation receiving unit 107 may be formed by using operation buttons provided separately from the display 106 and a pointing device such as a mouse.

An image reading unit 108 formed by using a so-called scanner apparatus reads an image on a document that has been set, and generates a read image (image data) of the document.

An image forming unit 109, which serves as an exemplary image forming section, uses, for example, an electrophotographic system to form a toner image according to image data, on a sheet of paper which is exemplary recording material. The image forming unit 109 may form an image by using another system such as an inkjet head system.

A communication unit 110 connected to a communication line (not illustrated) serves as a communication interface that communicates with other apparatuses connected to the communication line.

An image processor 111 performs image processing, such as color correction and gradation correction, on an image represented by image data.

A human detection sensor 112 detects presence of a user in an area surrounding the image forming apparatus 10, and determines the distance between the user who is present in the surrounding area and the image forming apparatus 10. In other words, the human detection sensor 112 functions as a ranging sensor that detects a user who is present around the image forming apparatus 10 and that measures the distance between the image forming apparatus 10 and the user. Examples of the human detection sensor 112 include an infrared sensor and an ultrasonic wave sensor. Each of an infrared sensor and an ultrasonic wave sensor uses a photo detector in the sensor to receive light, for example, that is emitted from a light source in the sensor onto a measurement target (a user in the exemplary embodiment) and that is reflected from the target. The received light is evaluated and converted into a distance so that the distance between the image forming apparatus 10 and the user is measured.

Figure 2:
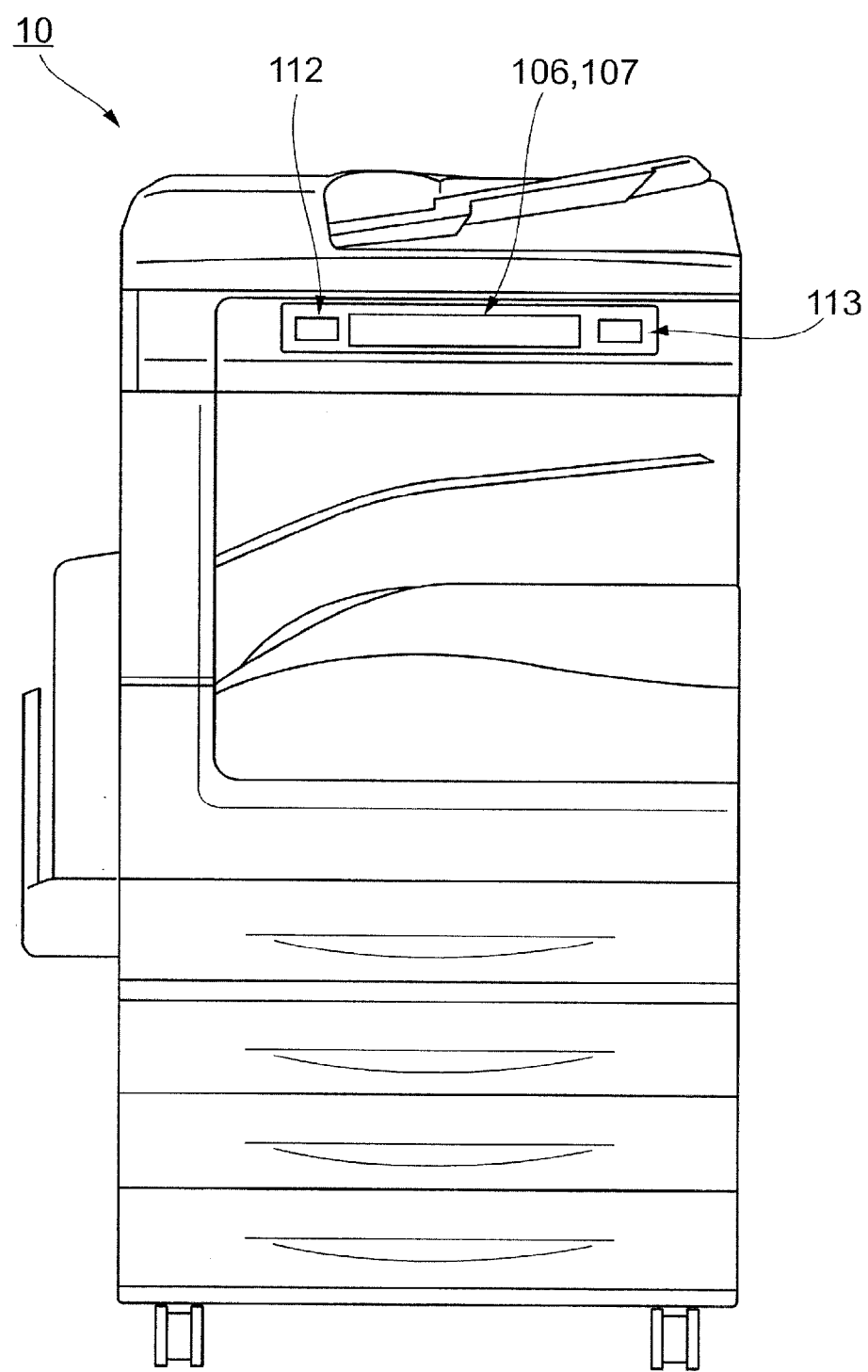
FIG. 2 is an exemplary view obtained when the image forming apparatus is viewed from the front.

FIG. 2 is an exemplary view obtained when the image forming apparatus 10 is viewed from the front. For example, as illustrated in FIG. 2, the human detection sensor 112 is disposed on the front of the image forming apparatus 10. In addition, the human detection sensor 112 is disposed near the display 106 of the image forming apparatus 10 (for example, beside the display 106), in other words, in an area defined in advance with respect to the display 106. Therefore, the human detection sensor 112 may be regarded as a unit that detects a user around the display 106 and that measures the distance between the display 106 and the user.

A line-of-sight detection sensor 113 detects the line of sight of a user who operates the image forming apparatus 10. As illustrated in FIG. 2, the line-of-sight detection sensor 113 is disposed on the front of the image forming apparatus 10. In addition, similarly to the human detection sensor 112, the line-of-sight detection sensor 113 is disposed near the display 106 of the image forming apparatus 10 (for example, beside the display 106), in other words, in an area defined in advance with respect to the display 106.

In the exemplary embodiment, the human detection sensor 112 and the line-of-sight detection sensor 113 are separate sensors which are disposed in respective different places. These sensors may be disposed together in one place.

A storage unit 105 is formed by using a storage device such as a hard disk device. For example, the storage unit 105 stores data received by the communication unit 110 and also stores read images (image data) generated by the image reading unit 108.

A controller 60 controls the units of the image forming apparatus 10. The controller 60 includes a central processing unit (CPU) 102, a read only memory (ROM) 103, and a random access memory (RAM) 104.

The ROM 103 is used to store programs executed by the CPU 102. The CPU 102 reads programs stored in the ROM 103, and uses the RAM 104 as a work area to execute the programs. The CPU 102 executes programs and thereby controls the units of the image forming apparatus 10. Thus, for example, the image forming apparatus 10 forms an image on a sheet of paper and reads a document to generate a read image for the document.

Functional Configuration of Controller

Figure 3:
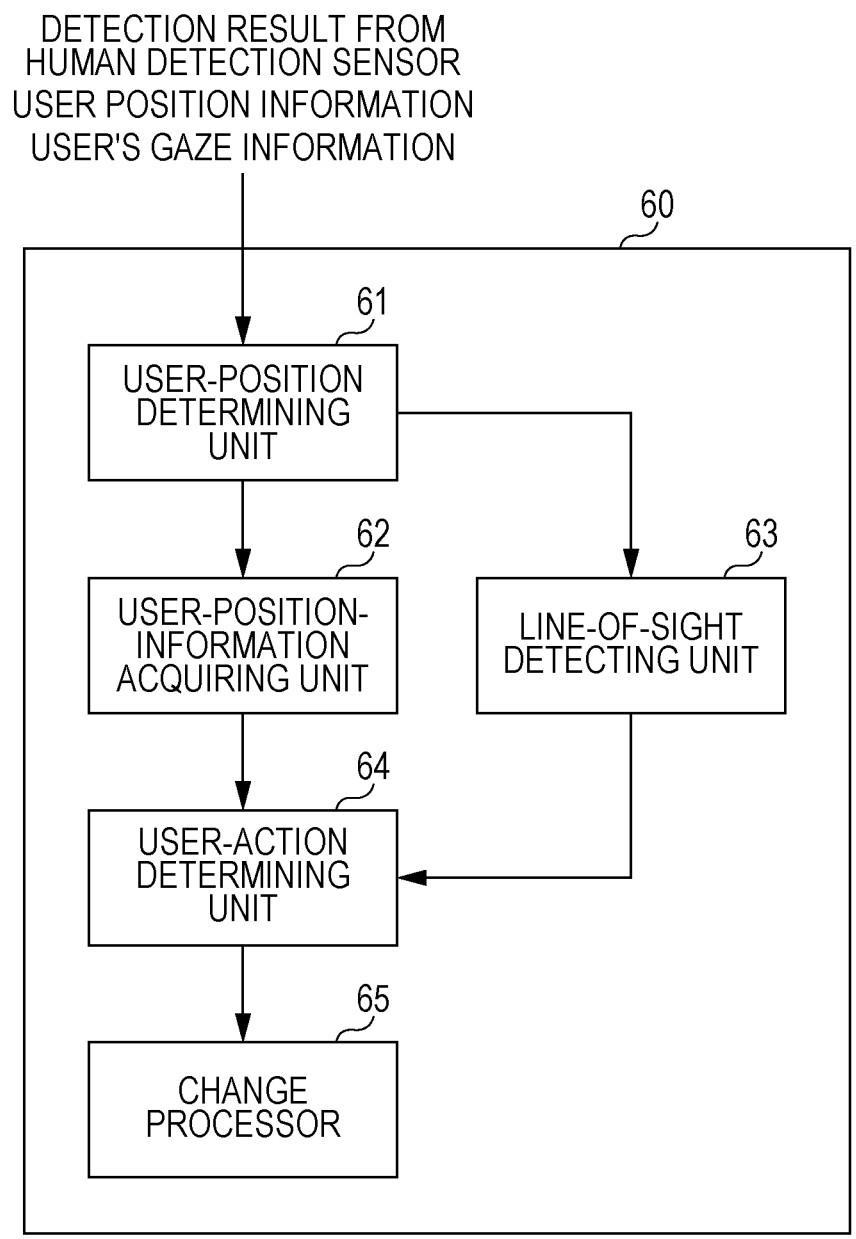
FIG. 3 is a block diagram illustrating an exemplary functional configuration of a controller.

The functional configuration of the controller 60 will be described. FIG. 3 is a block diagram illustrating an exemplary functional configuration of the controller 60. The controller 60 includes a user-position determining unit 61, a user-position-information acquiring unit 62, a line-of-sight detecting unit 63, a user-action determining unit 64, and a change processor 65.

On the basis of a detection result from the human detection sensor 112, the user-position determining unit 61 determines whether or not a user is present near the image forming apparatus 10 (display 106), in other words, within a predetermined distance from the image forming apparatus 10 (display 106). In the description below, the predetermined distance used in this determination may be referred to as a first distance.

When the user-position determining unit 61 determines that a user is present within the first distance from the image forming apparatus 10, the user-position-information acquiring unit 62 acquires information (hereinafter referred to as user position information) about the distance between the user (for example, user's face) and the image forming apparatus 10 (display 106), from the human detection sensor 112.

When the user-position determining unit 61 determines that a user is present within the first distance from the image forming apparatus 10, the line-of-sight detecting unit 63 obtains information (hereinafter referred to as user's gaze information) about the direction in which the user is gazing, from the line-of-sight detection sensor 113.

The user-action determining unit 64 determines a user's action on the basis of the user position information obtained by the user-position-information acquiring unit 62 and the user's gaze information obtained by the line-of-sight detecting unit 63. More specifically, in the determination of a user's action, the user-action determining unit 64 determines whether or not the distance between the user and the image forming apparatus 10 (display 106) is shorter than a predetermined distance while the state in which the display 106 is present in the user's gaze direction is maintained. The predetermined distance used in this determination is a distance shorter than the first distance. In the description below, this predetermined distance may be referred to as a second distance.

The second distance may be a fixed value for any user, or may be changed, for example, in accordance with the height or the like of a user.

When the user-action determining unit 64 determines that the distance between the user and the image forming apparatus 10 (display 106) is shorter than the second distance while the state in which the display 106 is present in the user's gaze direction is maintained, the change processor 65, which serves as a change processing section, performs a change process on an image displayed on the display 106. An exemplary change process is a process of enlarging a portion positioned in the user's gaze direction (that is, a portion that is being viewed by the user) in the image displayed on the display 106. In other words, the exemplary change process is a process of enlarging an area within a certain range which is positioned in the user's gaze direction. The change process is not limited to the enlargement process. For example, a process of scrolling a screen, a process of switching the entire screen to another screen, and the like are exemplary change processes.

When the distance between the user and the image forming apparatus 10 (display 106) is equal to or longer than the second distance, the change processor 65 returns the image displayed on the display 106, to the state before the change process. For example, when a portion positioned in the user's gaze direction has been enlarged, the portion is returned back to the state before the enlargement.

The functional units that are included in the controller 60 and that are illustrated in FIG. 3 are implemented with software collaborating with hardware resources. Specifically, when the image forming apparatus 10 is implemented by using the hardware configuration illustrated in FIG. 1, operating system (OS) programs and application programs which are stored in the ROM 103 are read onto the RAM 104 and the CPU 102 executes the programs so that the functions, such as the user-position determining unit 61, the user-position-information acquiring unit 62, the line-of-sight detecting unit 63, the user-action determining unit 64, and the change processor 65, are implemented.

Configuration of Line-of-Sight Detection Sensor

Figure 4:
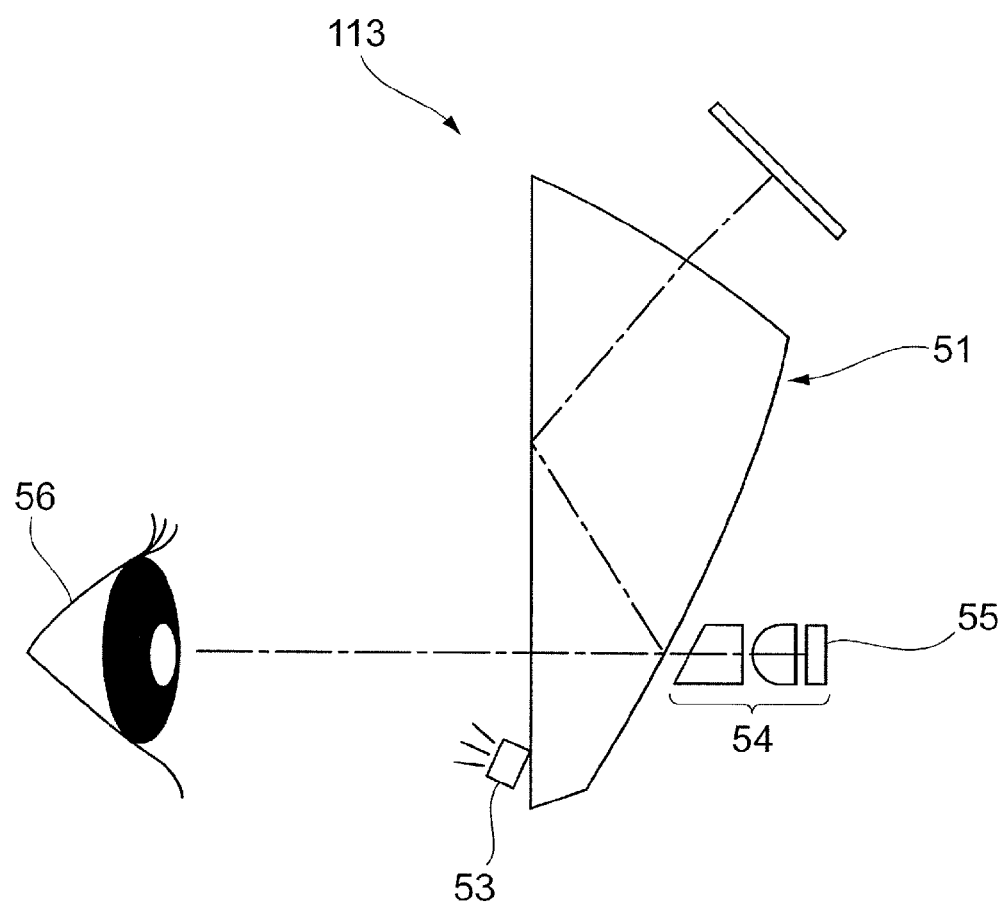
FIG. 4 is a diagram for describing an exemplary configuration of a line-of-sight detection sensor.
Figure 5A:
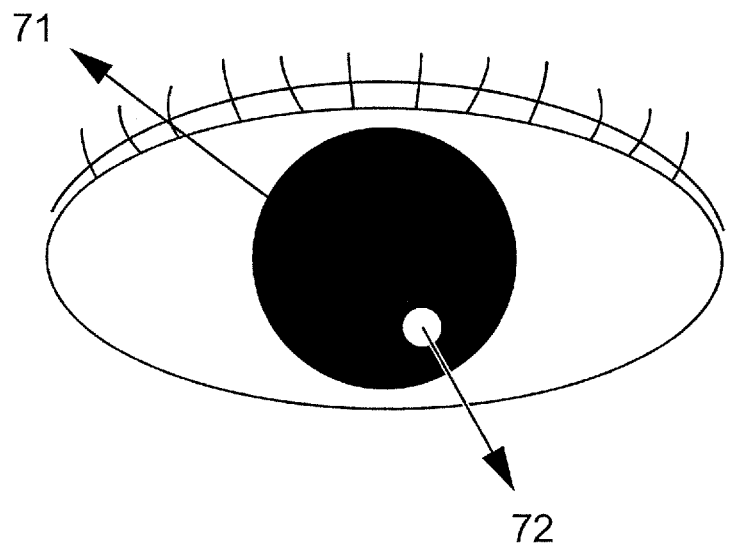
FIGS. 5A and 5B are diagrams for describing the exemplary configuration of the line-of-sight detection sensor.
Figure 5B:
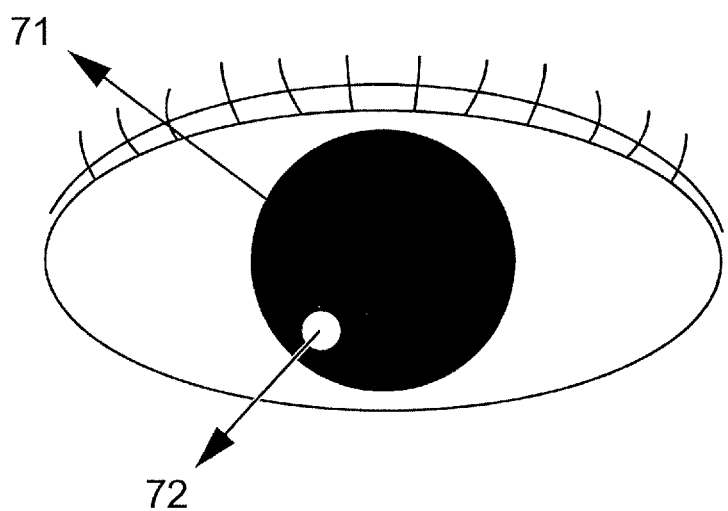

The configuration of the line-of-sight detection sensor 113 will be described. FIG. 4 and FIGS. 5A and 5B are diagrams for describing an exemplary configuration of the line-of-sight detection sensor 113.

As illustrated in FIG. 4, the line-of-sight detecting unit 113 includes a light source 53 that emits infrared spot light to user's eyeball 56. The infrared light reflected from the eyeball 56 enters an optical lens set 54 via a fine aperture stop provided for an eyepiece 51. The optical lens set 54 causes the infrared reflected incident light to converge, for image formation, to a spot on the imaging surface of a charge coupled device (CCD) 55. The CCD 55 converts, for output, a virtual image (Purkinje image) that is formed on the imaging surface and that is produced by the corneal reflection, into an electric signal.

As illustrated in FIGS. 5A and 5B, the virtual image is a virtual image 72 that is produced by the corneal reflection in which the infrared light emitted from the light source 53 is reflected at a pupil 71. A relative positional relationship between the center of the pupil 71 and the virtual image 72 changes proportionately with the rotation angle of the eyeball. In the exemplary embodiment, the electric signal which indicates the virtual image and which is transmitted from the CCD 55 is used to perform image processing. On the basis of the result of the image processing, the user's gaze direction is detected.

The method for detecting the user's gaze direction is not limited to the method illustrated in FIGS. 4 to 5B. Another known method may be used.

As the line-of-sight detection sensor 113, for example, an eye tracker or the like produced by Tobii Technology, Inc. may be used.

Procedure Performed by Image Forming Apparatus

The procedure performed by the image forming apparatus 10 according to the exemplary embodiment will be described. FIG. 6 is a flowchart illustrating an exemplary procedure performed by the image forming apparatus 10 according to the exemplary embodiment. The image forming apparatus 10 repeatedly performs the processes described in the flowchart in FIG. 6, at regular time intervals, such as every 100 milliseconds.

The user-position determining unit 61 determines whether or not a user is present within the first distance from the image forming apparatus 10, on the basis of the detection result from the human detection sensor 112 (step 101). If a negative determination (No) is made in step 101, the process flow is ended. In contrast, if a positive determination (Yes) is made in step 101, the user-action determining unit 64 then determines whether or not the distance between the user and the display 106 is shorter than the second distance while the state in which the display 106 is present in the user's gaze direction is maintained, on the basis of the user position information obtained by the user-position-information acquiring unit 62 and the user's gaze information obtained by the line-of-sight detecting unit 63 (step 102).

If a positive determination (Yes) is made in step 102, the change processor 65 performs the change process on an image displayed on the display 106 (step 103). For example, the change processor 65 enlarges a portion positioned in the user's gaze direction.

Then, the user-action determining unit 64 determines whether or not the distance between the user and the display 106 is equal to or longer than the second distance (step 104).

If a negative determination (No) is made in step 104, the user-action determining unit 64 repeatedly performs the determination process in step 104. In contrast, if a positive determination (Yes) is made in step 104, the change processor 65 returns the image displayed on the display 106 back to the state before the change process (step 105). For example, if the change processor 65 has enlarged the portion positioned in the user's gaze direction in step 103, the change processor 65 returns the image back to the state before the enlargement. Then, the process flow is ended.

If a negative determination (No) is made in step 102, in other words, if the user-action determining unit 64 determines that the display 106 is not present in the user's gaze direction or if the user-action determining unit 64 determines that the distance between the user and the display 106 is equal to or longer than the second distance (No in step 102), the process proceeds to step 101. In addition, in step 102, even if the distance between the user and the display 106 is shorter than the second distance, when the display 106 is not present in the user's gaze direction, a negative determination (No) is made. In the course of the change process on an image, if the user-action determining unit 64 determines that the display 106 is not present in the user's gaze direction or if the user-action determining unit 64 determines that the distance between the user and the display 106 is equal to or longer than the second distance, the change processor 65 may stop (interrupt) the change process on an image.

A negative determination (No) is made in step 102, and the process proceeds to step 101. Then, if the user-position determining unit 61 determines that a user is present within the first distance from the image forming apparatus 10 (Yes in step 101), the user-action determining unit 64 performs the determination process in step 102 again. In contrast, if the user-position determining unit 61 determines that no users are present within the first distance from the image forming apparatus 10 (No in step 101), the user has left an area near the image forming apparatus 10, and the process flow is ended.

As a case in which a user moves their face toward the display 106 to view an image on the display 106, the following exemplary cases may be considered: a case in which the user moves their face toward the display 106 without directing their line of sight away from the display 106; and a case in which the user views, for example, an area around the display 106 and temporarily redirects their line of sight. In addition, for example, after the user moves their face toward the display 106 without viewing the display 106, the user may direct their line of sight to the display 106 to view the display 106.

Therefore, in step 102, even when the line of sight of a user is directed away from the display 106, if a certain condition is satisfied, the user-action determining unit 64 may make a positive determination (Yes).

For example, the user-action determining unit 64 measures a time for which the display 106 is present in the user's gaze direction, and also measures a time for which the display 106 is not present in the user's gaze direction. On the basis of the measured times, the user-action determining unit 64 may determine whether or not the state in which the display 106 is present in the user's gaze direction is maintained. For example, when a ratio of the time for which the display 106 is present in the user's gaze direction with respect to the time for which the display 106 is not present in the user's gaze direction is equal to or larger than a predetermined threshold, even if the line of sight is temporarily directed away from the display 106, the user-action determining unit 64 may determine that the state in which the display 106 is present in the user's gaze direction is maintained.

For example, the user-action determining unit 64 may determine whether or not the display 106 is present in the user's gaze direction and the distance between the user and the display 106 is shorter than the second distance, without consideration of the user's gaze direction obtained in the process in which the user approaches the display 106. If the display 106 is present in the user's gaze direction and if the distance between the user and the display 106 is shorter than the second distance, the user-action determining unit 64 may make a positive determination (Yes) in step 102. In other words, if a state in which the display 106 is present in the user's gaze direction and in which the distance between the user and the display 106 is shorter than the second distance is continuously maintained for a certain period, the user-action determining unit 64 may make a positive determination (Yes). In such a determination process, whether or not the change process on an image is to be performed may be determined on the basis of the user's gaze direction and the distance between the user and the display 106 independently of how the user approaches the display 106.

Exemplary Process Performed by Image Forming Apparatus

An exemplary process performed by the image forming apparatus 10 according to the exemplary embodiment will be described. FIGS. 7A to 7D are diagrams for describing an exemplary process performed by the image forming apparatus 10 according to the exemplary embodiment. In the description below, the change processor 65 performs the change process by enlarging a portion positioned in the user's gaze direction. The steps described below correspond to the steps in FIG. 6.

Assume that a user A approaches an area near the image forming apparatus 10. As illustrated in FIG. 7A, the human detection sensor 112 detects presence of a user around the image forming apparatus 10. On the basis of the detection result from the human detection sensor 112, the user-position determining unit 61 determines whether or not a user is present within the first distance from the image forming apparatus 10 (step 101).

Figure 7B:
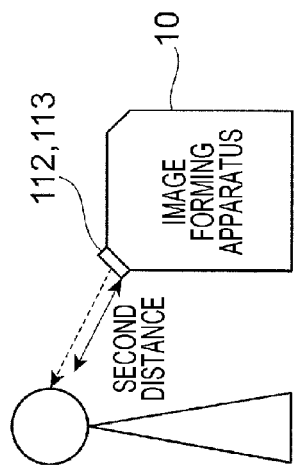
FIGS. 7A to 7D are diagrams for describing a specific example of the process performed by the image forming apparatus according to the exemplary embodiment.
Figure 7A:
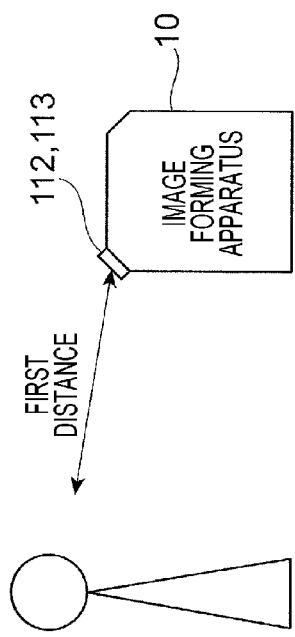

When the user A approaches within the first distance from the image forming apparatus 10, as illustrated in FIG. 7B, the human detection sensor 112 measures the distance between the image forming apparatus 10 and the user A. The line-of-sight detection sensor 113 detects the line of sight of the user A. Then, the user-action determining unit 64 determines whether or not the distance between the user A and the display 106 is shorter than the second distance while the state in which the display 106 is present in the gaze direction of the user A is maintained (step 102).

Figure 7D:
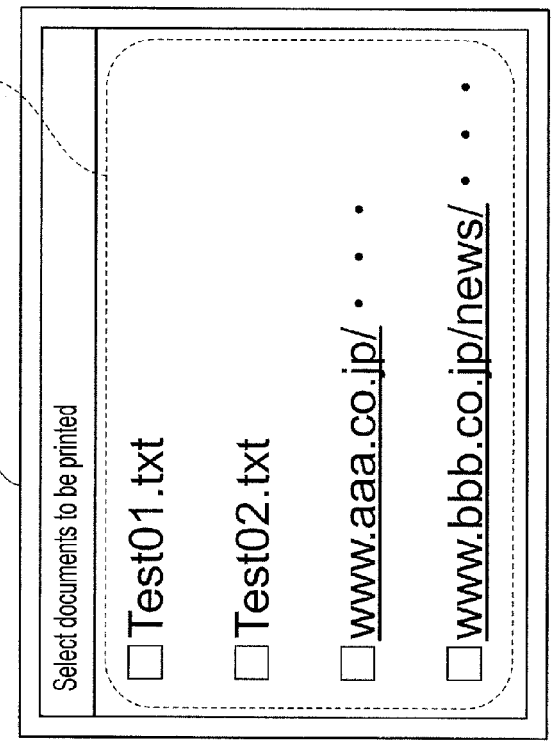
Figure 7C:
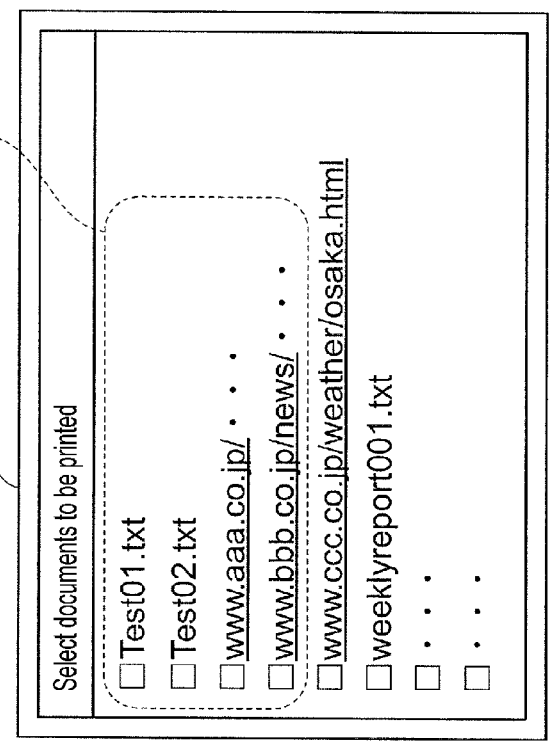

If the distance between the user A and the display 106 is shorter than the second distance while the state in which the display 106 is present in the gaze direction of the user A is maintained (Yes in step 102), the change processor 65 enlarges a portion positioned in the gaze direction of the user A (step 103). In the example in FIG. 7C, the change processor 65 detects a portion indicated by a region 81 as the portion positioned in the gaze direction of the user A. In this case, as illustrated in FIG. 7D, the change processor 65 enlarges the image in the region 81 and displays the enlarged image on the display 106. Thus, a portion positioned in the gaze direction of the user A is enlarged so that the portion that is being viewed by the user A is enlarged. Accordingly, the user A easily views the display on the display 106.

Another Exemplary Determination Process Performed by User-Action Determining Unit Another exemplary determination process performed by the user-action determining unit 64 will be described. In the above-described example, the user-action determining unit 64 determines whether or not the distance between a user and the display 106 is shorter than the second distance. This configuration is not limiting. For example, the user-action determining unit 64 may calculate a ratio of the current distance between a user and the display 106 with respect to the distance (hereinafter referred to as an initial distance) initially obtained when the user has stopped in front of the image forming apparatus 10 (in front of the display 106), so as to perform the determination process. In this case, the user-action determining unit 64 may be regarded as an exemplary grasping section.

More specifically, when the user stops in front of the display 106, in other words, when the user is present within the first distance from the display 106 for a certain time, the user-action determining unit 64 obtains information about the distance between the user and the display 106 from the user-position-information acquiring unit 62. The obtained distance information is temporarily stored and held as the initial distance, for example, in the RAM 104. After that, the user-action determining unit 64 obtains information about the current distance between the user and the display 106 from the user-position-information acquiring unit 62 at regular time intervals such as every 100 milliseconds. Then, a ratio of the current distance to the initial distance (=current distance/initial distance) is calculated.

The user-action determining unit 64 determines whether or not the calculated ratio is less than a predetermined threshold (predetermined ratio) while the state in which the display 106 is present in the user's gaze direction is maintained. If a positive determination (Yes) is made in this determination, like the case in which a positive determination is made in step 102 in FIG. 6, the change processor 65 performs the change process on an image. After that, when the calculated ratio is equal to or larger than the threshold, like the case in which a positive determination is made in step 104 in FIG. 6, the change processor 65 returns the image back to the state before the change process.

Also in the determination process in this example, similarly to step 102 in FIG. 6 which is described above, the user-action determining unit 64 may make a positive determination (Yes) even when the line of sight is directed away from the display 106 if the certain condition is satisfied.

More specifically, for example, the user-action determining unit 64 may measure the time for which the display 106 is present in the user's gaze direction, and may also measure the time for which the display 106 is not present in the user's gaze direction. Then, the user-action determining unit 64 may determine whether or not the state in which the display 106 is present in the user's gaze direction has been maintained, on the basis of the measured times.

In addition, for example, if the display 106 is present in the user's gaze direction and if a ratio of the current distance between the user and the display 106 with respect to the initial distance is less than the predetermined threshold, the user-action determining unit 64 may make a positive determination (Yes). In other words, if the state in which the display 106 is present in the user's gaze direction and in which a ratio of the current distance between the user and the display 106 with respect to the initial distance is less than the predetermined threshold is continuously maintained for a certain time, the user-action determining unit 64 may make a positive determination (Yes).

As described above, the controller 60 of the image forming apparatus 10 according to the exemplary embodiment determines whether or not the change process is to be performed on an image, on the basis of the user's gaze direction and the distance between the user and the image forming apparatus 10 (display 106). Therefore, for example, when a user approaches the display 106 without viewing the display 106 (having no intention of viewing the display 106), such as when the user bends down to open and close a paper-feed unit (paper tray) provided in a lower portion of the image forming apparatus 10, the change process on an image is not performed as long as the user does not gaze the display 106 after that.

Assume that the change process on an image is performed when a user does not view the display 106. For example, when the user views the display 106 after that, the display has been already changed. Options other than an option that is to be selected by the user may be enlarged or an option that is to be selected by the user may disappear from the display. Accordingly, through the process performed by the controller 60 according to the exemplary embodiment, for example, in comparison with a case in which user's approach causes the change process on an image to be performed even when the user approaches the display 106 without viewing the display 106, the change process on an image is performed in accordance with the position and the line of sight of the user, achieving suppression of reduction in user operability.

In the exemplary embodiment, the description is made under the assumption that the second distance is a single value. However, the second distance may be set stepwise. In other words, multiple different distances may be provided as the second distance. In the case where the second distance is set stepwise, the change process on an image is performed stepwise in accordance with the distance between a user and the display 106. That is, in accordance with the distance between a user and the display 106, for example, an image is enlarged and displayed stepwise or a process of switching the entire screen to another screen is continuously performed.

In the exemplary embodiment, the controller 60, the display 106, and the like are functional units related to display of an image. These may be regarded as functional units included in an image display apparatus.

As a matter of course, programs achieving the exemplary embodiment of the present invention may be provided by using a communication unit. The programs may be also provided by storing the programs in a recording medium such as a compact disc-read-only memory (CD-ROM).

The exemplary embodiment of the present invention is described above. The technical scope of the present invention is not limited to the scope described in the exemplary embodiment. It is obvious from the claims that an embodiment obtained by making various changes and improvements on the exemplary embodiment is encompassed in the technical scope of the present invention.

What is claimed is:

1. An image forming apparatus comprising:
    an image display that displays an image;
    one or more sensors that detect a user's presence and detect a user's gaze direction; and
    a processor programmed to
        determine if the image display is present in the detected user's gaze direction and if a distance between the user and the image display is shorter than a predetermined distance, and
        in response to determining both that the image display is present in the detected user's gaze direction and that the distance between the user and the image display is shorter than the predetermined distance, perform a change process on the image displayed on the image display, wherein
    the change process is at least one of enlarging a portion of the image that is within the user's gaze direction, scrolling the image, and replacing the image with a different image.

2. The image forming apparatus according to claim 1, wherein,
    if the distance between the user and the image display is shorter than the predetermined distance while a state in which the image display is present in the user's gaze direction is maintained, the processor performs the change process on the image displayed on the image display.

3. The image forming apparatus according to claim 1, wherein
    the processor is programmed to grasp an initial distance between the image display and the user, the initial distance being obtained when the user stands in front of the image display, wherein,
    if the image display is present in the user's gaze direction and if a ratio of a distance between the user and the image display with respect to the initial distance is less than a predetermined threshold, the processor performs the change process on the image displayed on the image display.

4. The image forming apparatus according to claim 1, wherein
    the processor performs, as the change process, the enlarging of the portion of the image displayed on the image display, the portion being positioned in the user's gaze direction.

5. The image forming apparatus according to claim 2, wherein
    the processor performs, as the change process, the enlarging of the portion of the image displayed on the image display, the portion being positioned in the user's gaze direction.

6. The image forming apparatus according to claim 3, wherein
    the processor performs, as the change process, the enlarging of the portion of the image displayed on the image display, the portion being positioned in the user's gaze direction.

7. The image forming apparatus according to claim 1, further comprising
    an image forming section that forms the image on recording material.

8. A non-transitory computer readable medium storing a program causing a computer to execute a process comprising:
    causing an image display to display an image;
    detecting a user's presence and detecting a user's gaze direction using one or more sensors;
    determining if the image display is present in the detected user's gaze direction and if a distance between the user and the image display is shorter than a predetermined distance; and
    in response to determining both that the image display is present in the detected user's gaze direction and that the distance between the user and the image display is shorter than the predetermined distance, performing a change process on the image displayed on the image display, wherein
    the change process is at least one of enlarging a portion of the image that is within the user's gaze direction, scrolling the image, and replacing the image with a different image.

* * * * *